(12) United States Patent
Wang et al.

(10) Patent No.: US 10,667,634 B2
(45) Date of Patent: Jun. 2, 2020

(54) TABLEWARE ARTICLE WITH COLLAPSIBLE BASE

(71) Applicant: Olababy, Inc., Hillsboro, OR (US)

(72) Inventors: Paul Wang, Portland, OR (US); Qiao Lin, Seattle, WA (US); Benny Sun, Shenzhen (CN)

(73) Assignee: Olababy, Inc., Hillsboro, OR (US)

( * ) Notice: Subject to any disclaimer, the term of this patent is extended or adjusted under 35 U.S.C. 154(b) by 214 days.

(21) Appl. No.: 15/597,653

(22) Filed: May 17, 2017

(65) Prior Publication Data
US 2018/0332984 A1    Nov. 22, 2018

(51) Int. Cl.
| | | |
|---|---|---|
| *A47G 19/02* | (2006.01) |
| *B65D 21/08* | (2006.01) |
| *A47G 19/22* | (2006.01) |
| *A47J 43/24* | (2006.01) |
| *A47J 27/10* | (2006.01) |
| *A47G 23/06* | (2006.01) |
| *B65D 1/24* | (2006.01) |
| *B65D 25/28* | (2006.01) |

(52) U.S. Cl.
CPC ............. *A47G 19/02* (2013.01); *A47G 23/06* (2013.01); *A47J 27/10* (2013.01); *A47J 43/24* (2013.01); *B65D 1/24* (2013.01); *B65D 21/086* (2013.01); *A47G 2019/2277* (2013.01); *B65D 25/2888* (2013.01); *B65D 25/2897* (2013.01)

(58) Field of Classification Search
CPC ...... A47G 2019/2277; A47G 2021/002; A45F 2003/205; B60N 3/102; B65D 1/0292; B65D 1/225; B65D 11/18; B65D 11/186; B65D 21/086

USPC ......... 248/150, 311.2, 346.3, 346.4; 220/666
See application file for complete search history.

(56) References Cited

U.S. PATENT DOCUMENTS 766,427 A * 8/1904 Crowell ................. A47G 19/02
                                                      220/575
1,021,004 A * 3/1912 Sanford ............... B65D 51/246
                                                      215/41

(Continued)

FOREIGN PATENT DOCUMENTS

| CN | 2914879 | 6/2007 |
|---|---|---|
| CN | 201370498 | 12/2009 |

(Continued)

OTHER PUBLICATIONS

PDF of http://www.kitcheninnovationsinc.com:80/steam-it-silicone-steamer-2, Kitchen Innovations Inc., "Steam It Silicone Steamer," 4 pp., archived by the Internet Archive on Sep. 4, 2015.

(Continued)

*Primary Examiner* — Mollie Impink
(74) *Attorney, Agent, or Firm* — Klarquist Sparkman, LLP

(57) ABSTRACT

An article of tableware has a container portion defining a well, and a base portion coupled to the container portion. The base portion includes a foot portion and a hinge portion. The hinge portion includes a first hinge line and a second hinge line, and the foot portion is coupled to the hinge portion at the first hinge line. The hinge portion is pivotable about the first and second hinge lines such that the foot portion is movable between an extended position and a retracted position to adjust a height of the tableware article.

20 Claims, 9 Drawing Sheets

(56) References Cited

U.S. PATENT DOCUMENTS

| | | | | | |
|---|---|---|---|---|---|
| 1,220,495 | A | * | 3/1917 | Cadby | A47G 19/02 |
| | | | | | 220/574 |
| 2,170,311 | A | | 8/1939 | Smith | |
| 2,625,020 | A | | 1/1953 | Oliver | |
| 2,667,117 | A | | 1/1954 | Millard et al. | |
| 6,129,687 | A | * | 10/2000 | Powell | A61H 15/02 |
| | | | | | 220/4.07 |
| 6,412,652 | B1 | * | 7/2002 | Woram | B65D 21/086 |
| | | | | | 220/521 |
| 7,678,271 | B2 | | 3/2010 | Curtin | |
| 8,337,073 | B2 | * | 12/2012 | Roberts | A47G 19/02 |
| | | | | | 220/575 |
| D731,685 | S | * | 6/2015 | Young | D26/10 |
| 2005/0127074 | A1 | | 6/2005 | Kusuma et al. | |
| 2008/0072768 | A1 | | 3/2008 | Foster et al. | |
| 2010/0170840 | A1 | | 7/2010 | Curtin | |
| 2013/0181000 | A1 | * | 7/2013 | Miksovsky | A45F 3/20 |
| | | | | | 220/780 |
| 2014/0246445 | A1 | * | 9/2014 | Lee | A47L 19/04 |
| | | | | | 220/666 |
| 2015/0251795 | A1 | * | 9/2015 | Tsui | A45C 7/0031 |
| | | | | | 215/306 |
| 2015/0321593 | A1 | * | 11/2015 | North | B60N 3/002 |
| | | | | | 224/544 |
| 2017/0049273 | A1 | * | 2/2017 | Priestner | A47J 43/24 |
| 2018/0370674 | A1 | * | 12/2018 | Rigardo | B67D 1/0001 |
| 2019/0085503 | A1 | * | 3/2019 | Tsui | D06F 95/002 |

FOREIGN PATENT DOCUMENTS

| | | |
|---|---|---|
| CN | 201709686 | 1/2011 |
| PT | 2138074 | 5/2014 |

OTHER PUBLICATIONS

PDF of http://www.siliconwristband.com/37-silicone-kitchenware, Space Peak Silicone Products Factory, Silicone Kitchenware, 3 pp., archived by the Internet Archive on Oct. 26, 2015.

International Search Report and Written Opinion issued in International Patent Application No. PCT/US2018/032881, dated Sep. 13, 2018, 10pp.

* cited by examiner

TABLEWARE ARTICLE WITH COLLAPSIBLE BASE

FIELD

The present application relates to tableware having an extendable and retractable base.

BACKGROUND

It can be desirable to place a tableware article, such as a plate or a bowl, in a bath of hot water in order to heat the contents of the tableware article. However, many plates and bowls do not have a base with sufficient height to allow them to be stably set in even shallow water. Moreover, setting a plate or a bowl in water often traps air beneath it, further destabilizing the plate or bowl. Accordingly, there is a need for improvements to tableware.

SUMMARY

Certain embodiments of the disclosure concern tableware articles with a collapsible base. In a representative embodiment, an article of tableware comprises a container portion defining a well, and a base portion coupled to the container portion. The base portion includes a foot portion and a hinge portion. The hinge portion includes a first hinge line and a second hinge line, and the foot portion is coupled to the hinge portion at the first hinge line. The hinge portion is pivotable about the first and second hinge lines such that the foot portion is movable between an extended position and a retracted position to adjust a height of the tableware article.

In another representative embodiment, a method comprises situating a tableware article in a liquid bath. The tableware article includes a container portion defining a well, and a base portion coupled to the container portion. The base portion includes a foot portion and a hinge portion. The hinge portion includes a first hinge line and a second hinge line, and the foot portion is coupled to the hinge portion at the first hinge line. The hinge portion is pivotable about the first and second hinge lines such that the foot portion is movable between an extended position and a retracted position to adjust a height of the tableware article. The foot portion is in the extended position when the tableware article is situated in the liquid bath. The method further comprises removing the tableware article from the liquid bath, and moving the foot portion to the retracted position.

In another representative embodiment, a method comprises making a tableware article including a container portion and a base portion. The container portion defines a well, and the base portion is coupled to the container portion. The base portion includes a foot portion and a hinge portion. The hinge portion includes a first hinge line and a second hinge line. The foot portion is coupled to the hinge portion at the first hinge line, and the hinge portion is pivotable about the first and second hinge lines such that the foot portion is movable between an extended position and a retracted position to adjust a height of the tableware article.

In another representative embodiment, a tableware article comprises a container portion including a wall defining a well. The wall includes a rim portion that is sloped such that the rim portion defines an upper rim portion and a lower rim portion. The tableware article further includes a handle portion disposed within the container portion and extending inwardly from an interior surface of the wall.

The foregoing and other objects, features, and advantages of the disclosed technology will become more apparent from the following detailed description, which proceeds with reference to the accompanying figures.

DETAILED DESCRIPTION

Various embodiments of tableware articles including a movable or collapsible base are described herein. A representative embodiment includes a container portion supported on a base portion that is collapsible such that a foot portion of the base portion is movable between an extended position and a retracted position. By moving the foot portion between the extended position and the retracted position, the distance or height of the container portion above a surface on which the tableware article is set can be adjusted. Thus, when the foot portion is in the extended position, the tableware article can be placed, for example, in a shallow bath of hot water such that the container portion is supported above the water bath in order to heat the contents of the container portion. This method of heating the contents of the container portion can be desirable when heating, for example, food for infants or young children. The tableware article can then be removed from the water bath, and the base portion can be collapsed such that the foot portion moves from the extended position to the retracted position for serving.

Figure 1:
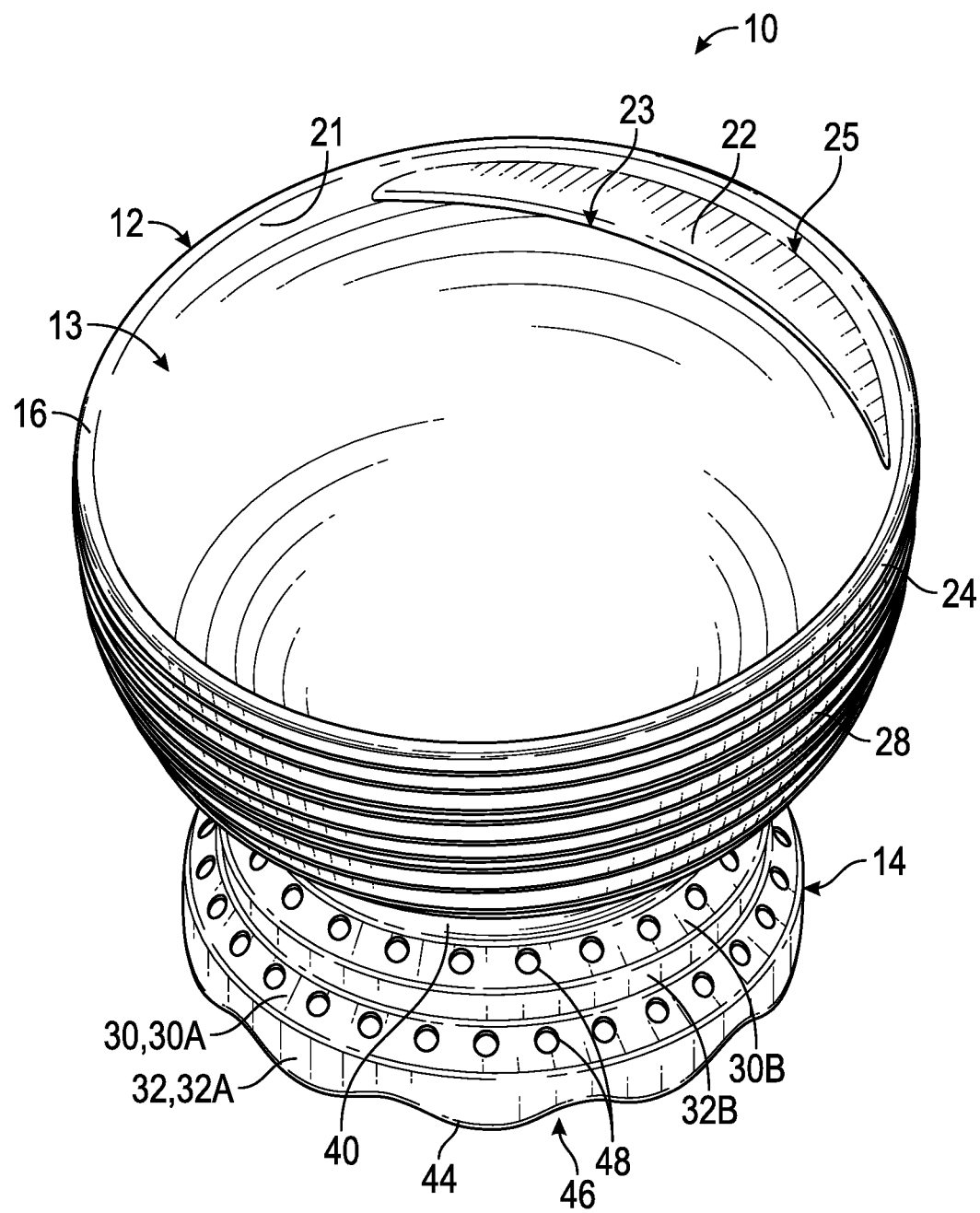
FIG. 1 is a perspective view of a representative embodiment of an article of tableware configured as a bowl.

FIG. 1 illustrates a representative embodiment of such a tableware article configured as a bowl 10. The bowl 10 can include a container portion configured as a bowl portion 12, and a base portion 14 coupled to the bowl portion 12 and configured to support the bowl portion above the base portion. The bowl portion 12 can include a well 13 defined by a curved wall 24.

Figure 4:
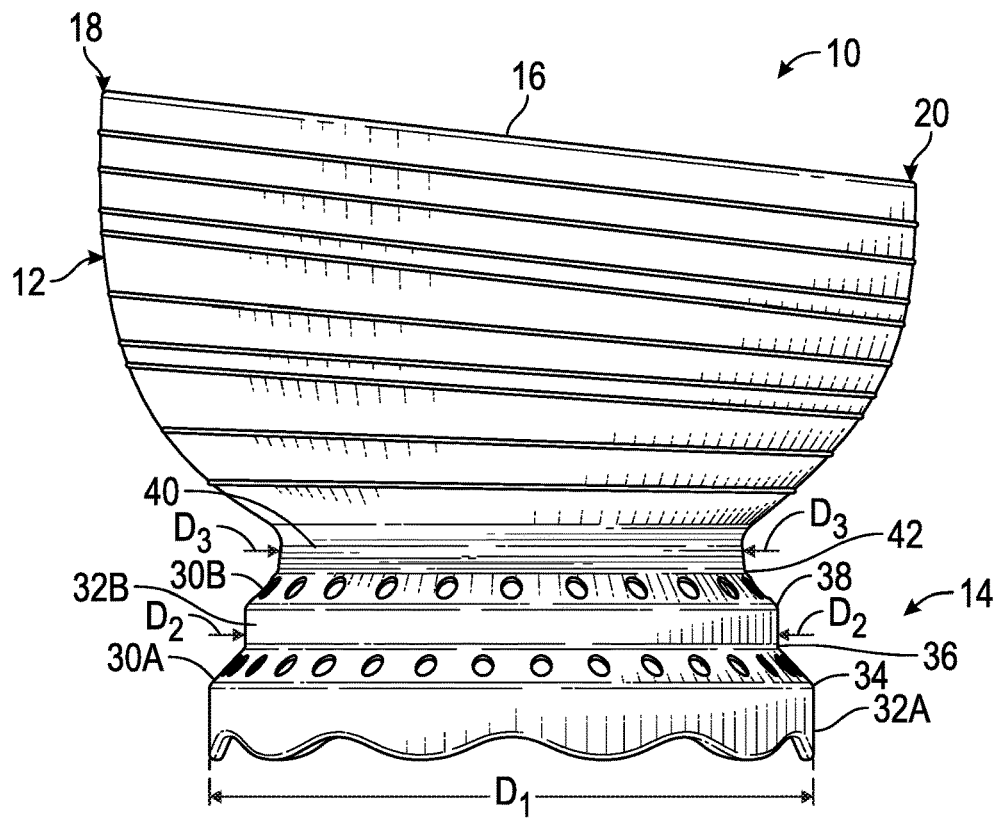
FIG. 4 is a left side view of the bowl of FIG. 1.
Figure 5:
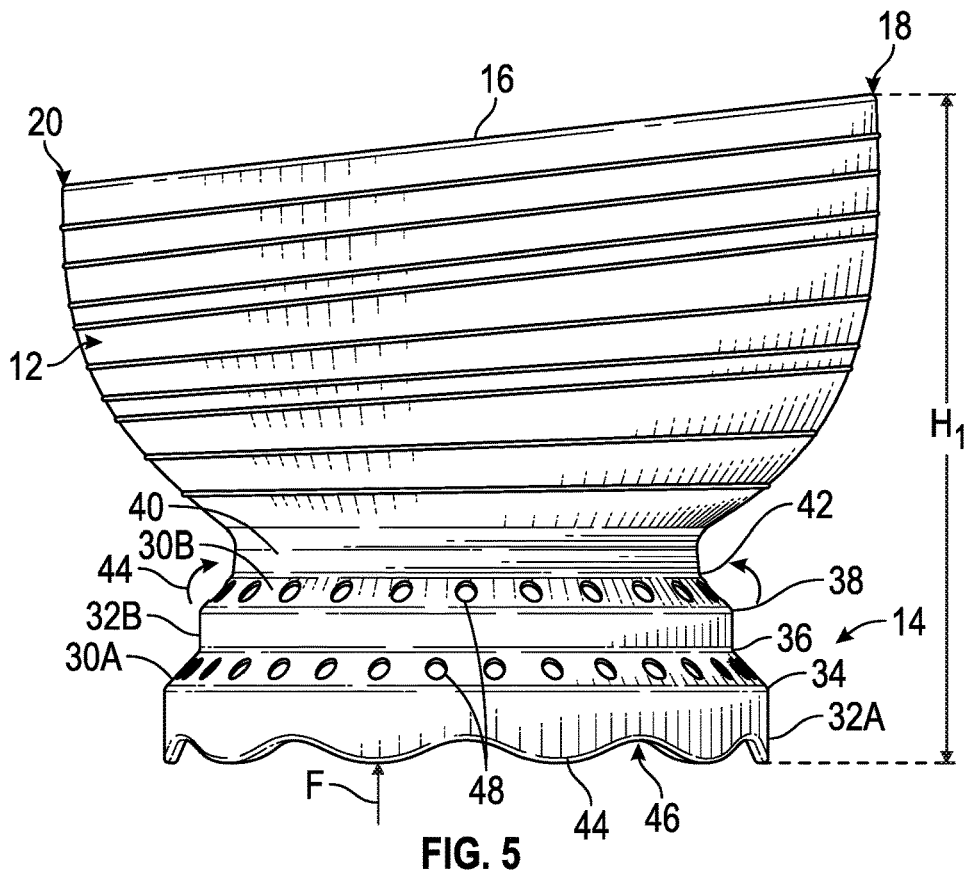
FIG. 5 is a right side view of the bowl of FIG. 1.

With reference to FIGS. 4 and 5, a rim 16 of the bowl portion 12 can be sloped such that the rim 16 has an upper rim portion 18 and a lower rim portion 20, with the upper rim portion being higher than the lower rim portion when the bowl is supported on a level surface.

Figure 2:
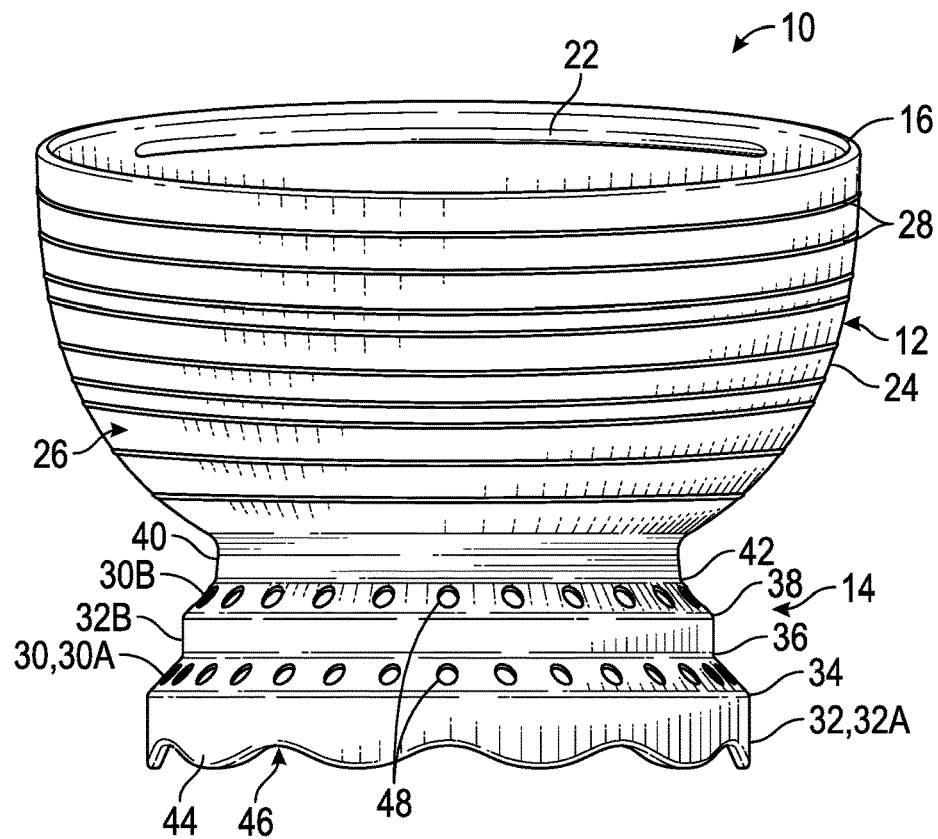
FIG. 2 is a front view of the bowl of FIG. 1.
Figure 3:
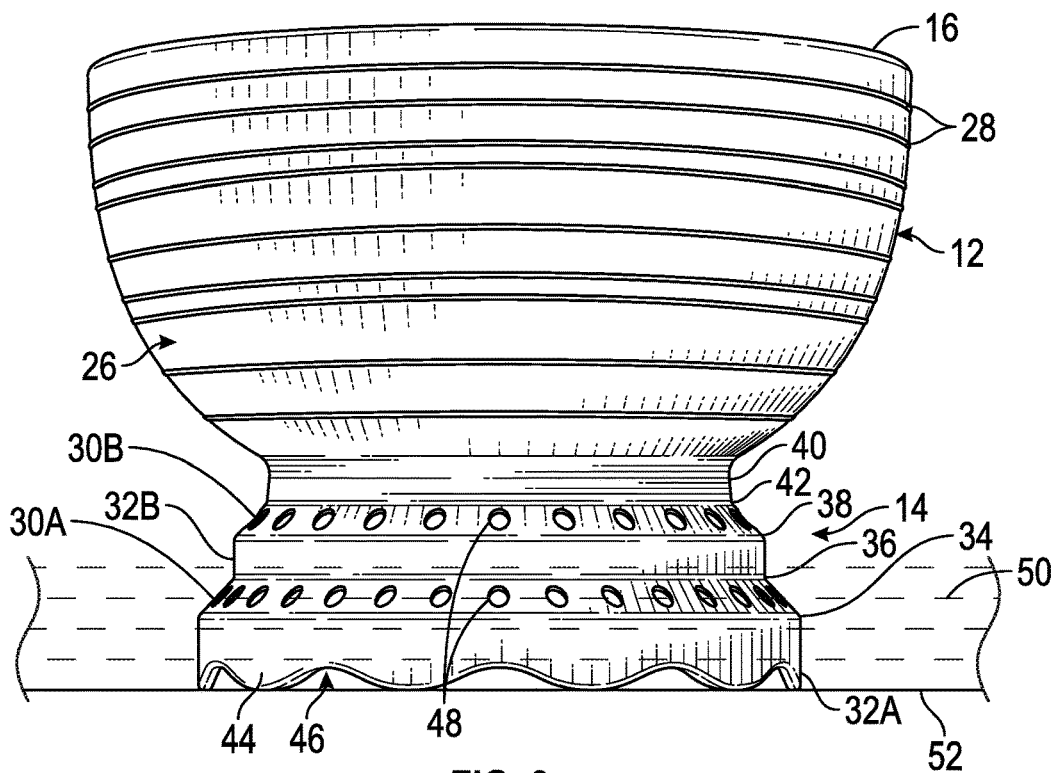
FIG. 3 is a rear view of the bowl of FIG. 1.
Figure 6:
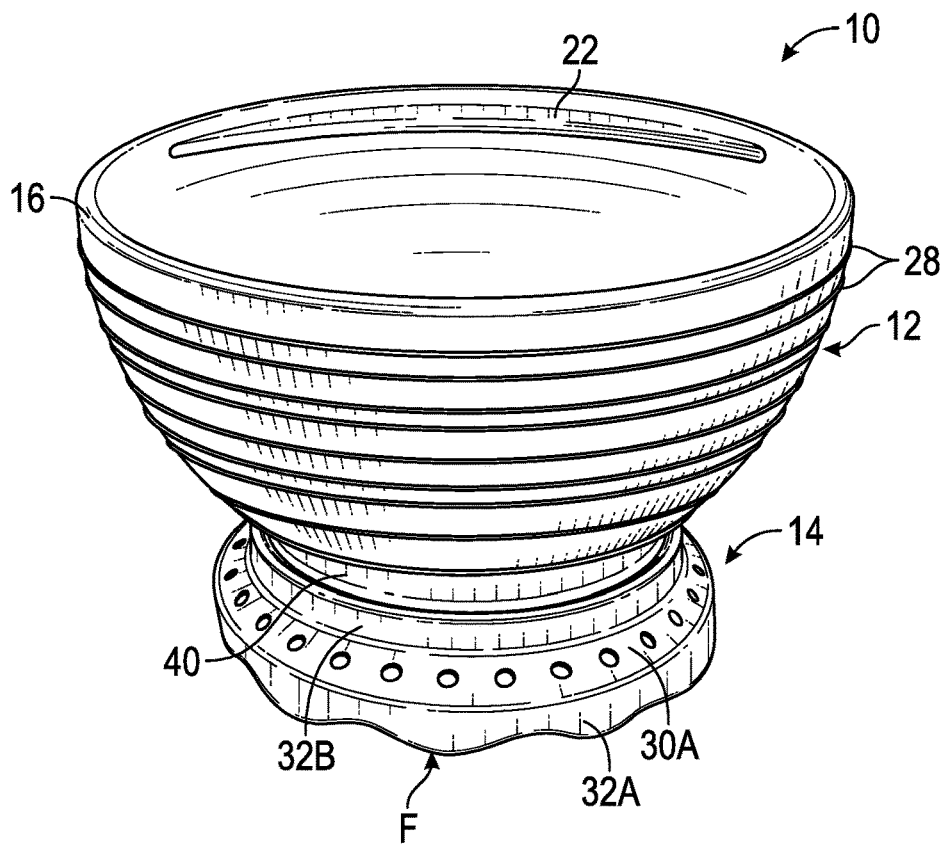
FIG. 6 is a perspective view of the bowl of FIG. 1 illustrating the base portion in a partially collapsed position with the second hinge portion pivoted upwardly toward the bowl portion.

Referring to FIGS. 1, 2, and 6, the bowl portion 12 can also include a handle portion 22. In the illustrated configuration, the handle portion 22 extends radially inwardly from the interior surface 21 of the upper rim portion 18 toward the center of the bowl portion 12. A radially inward edge 23 and a radially outward edge 25 of the handle portion 22 can be curved, such that the handle portion forms a crescent-shaped member. In other embodiments, the handle portion 22 can have a variety of different shapes. For example, in some embodiments the inward edge 23 of the handle portion 22 can be straight, while the outward edge 25 is curved to match the curvature of the bowl portion 12. The handle portion 22 can also extend along any suitable proportion of the circumference of the bowl portion 12, as desired.

Figure 10:
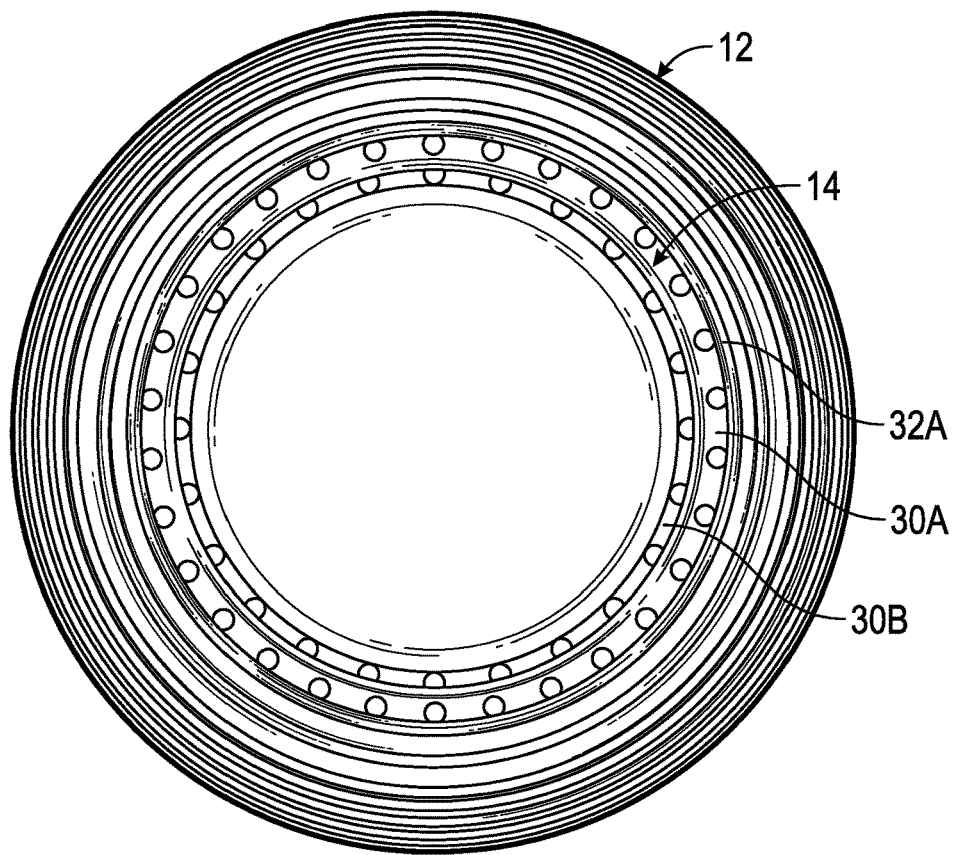
FIG. 10 is a bottom plan view of the bowl of FIG. 1 with the foot portion shown in the extended position.
Figure 11:
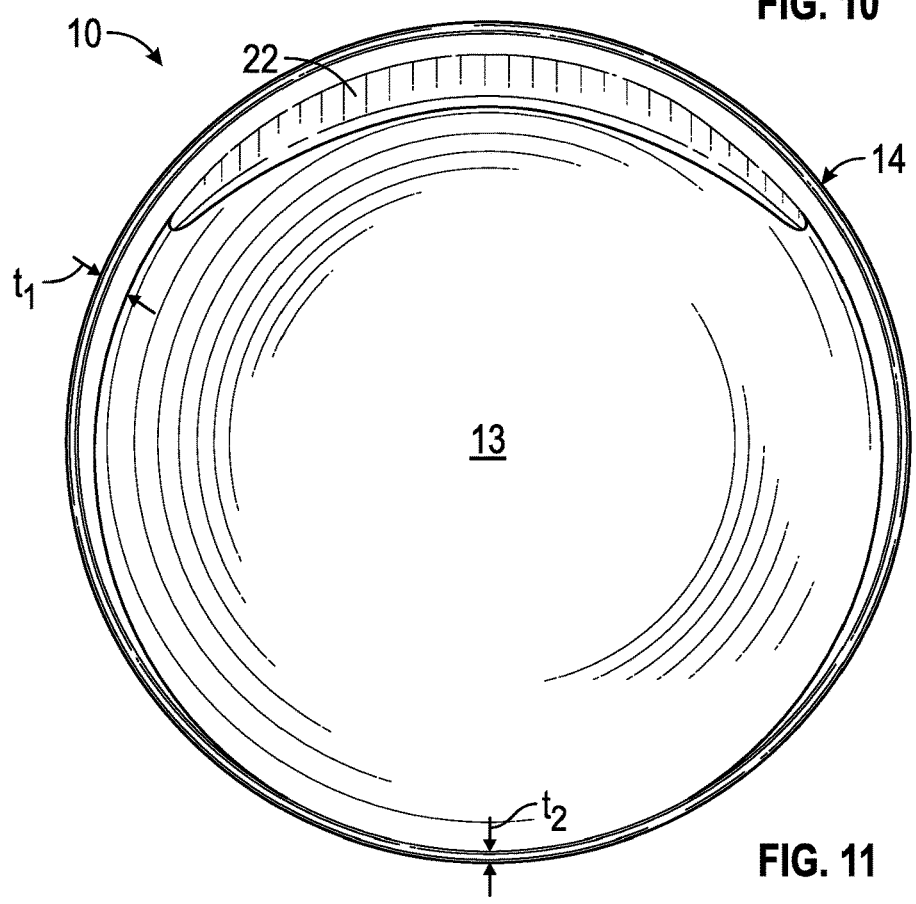
FIG. 11 is a top plan view of the bowl of FIG. 1.

In some embodiments, a thickness of the wall 24 can vary about the circumference of the bowl portion 12. For example, with reference to FIG. 10, the wall 24 can have a first thickness $t_1$ along the portion of the circumference of the bowl adjacent the upper rim portion 18 and/or the handle portion 22. The thickness of the wall 24 can decrease along the circumference of the bowl such that a portion of the wall diametrically opposite the handle portion 22 can have a second thickness $t_2$ that is less than the first thickness $t_1$. In this manner, in embodiments where the bowl 10 is made from a flexible material, the increased thickness of the wall 24 at the handle portion 22 can reduce deformation of the bowl when the bowl is grasped or lifted using the handle portion 22, as described in greater detail below. In a representative embodiment, the thickness $t_1$ can be about 4.5 mm, and the thickness $t_2$ can be about 2.8 mm.

Figure 12:
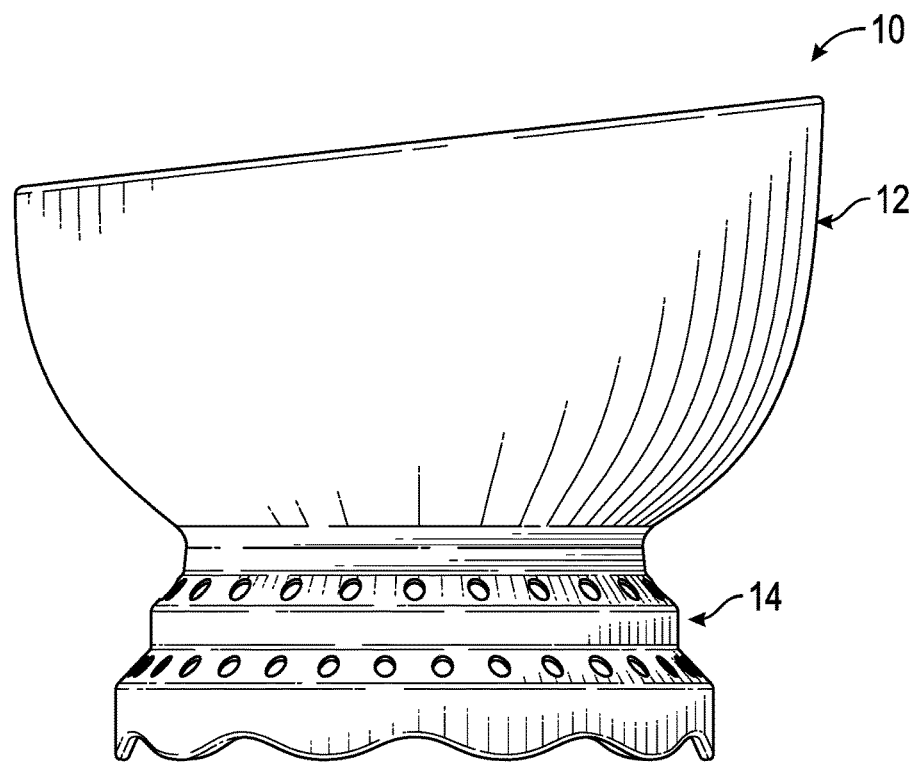
FIG. 12 is a right side view of another embodiment of the bowl of FIG. 1.

In the illustrated embodiment, an exterior surface 26 of the bowl portion 12 can be textured to, for example, facilitate gripping the bowl portion without slipping. For example, with reference to FIGS. 1-9, the exterior surface 26 can include a plurality of circumferentially-extending ribs or ridges 28 spaced apart along the height of the bowl portion 12. Alternatively, the exterior surface 26 can include any of various other textures or surface treatments, such as bumps, protrusions, etc. In other embodiments, the exterior surface 26 need not include any texturing or surface treatment, and can be smooth, as shown in FIG. 12. The surface 26 may also include graphics, patterns, etc., as desired.

Figure 8:
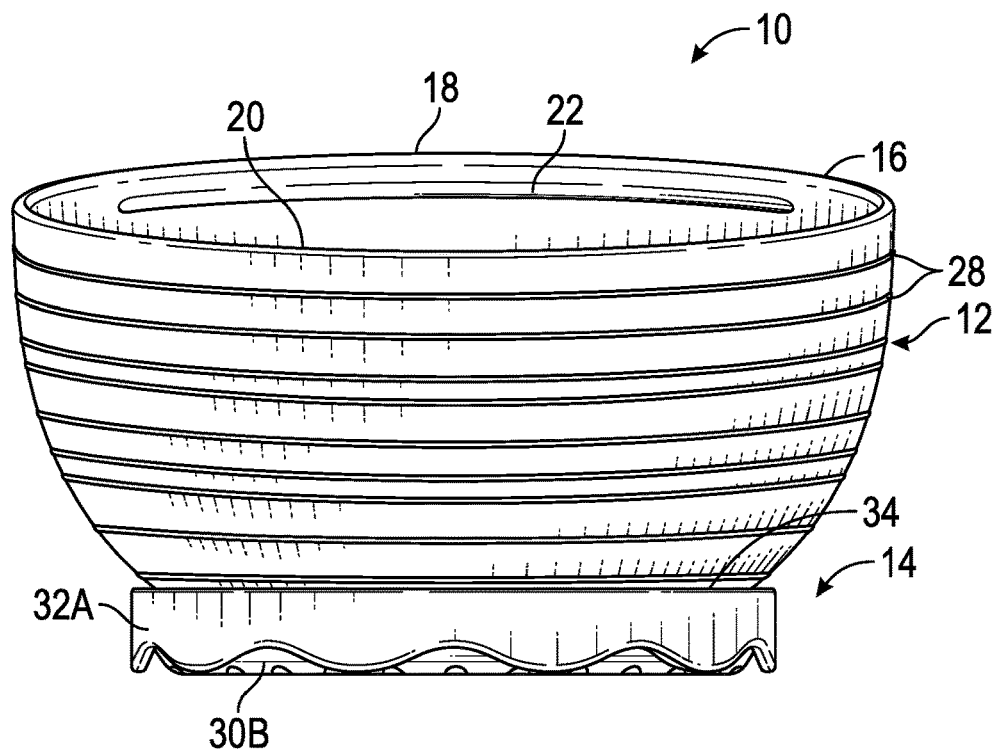
FIG. 8 is a front view of the bowl of FIG. 1 illustrating the foot portion in the retracted position.
Figure 9:
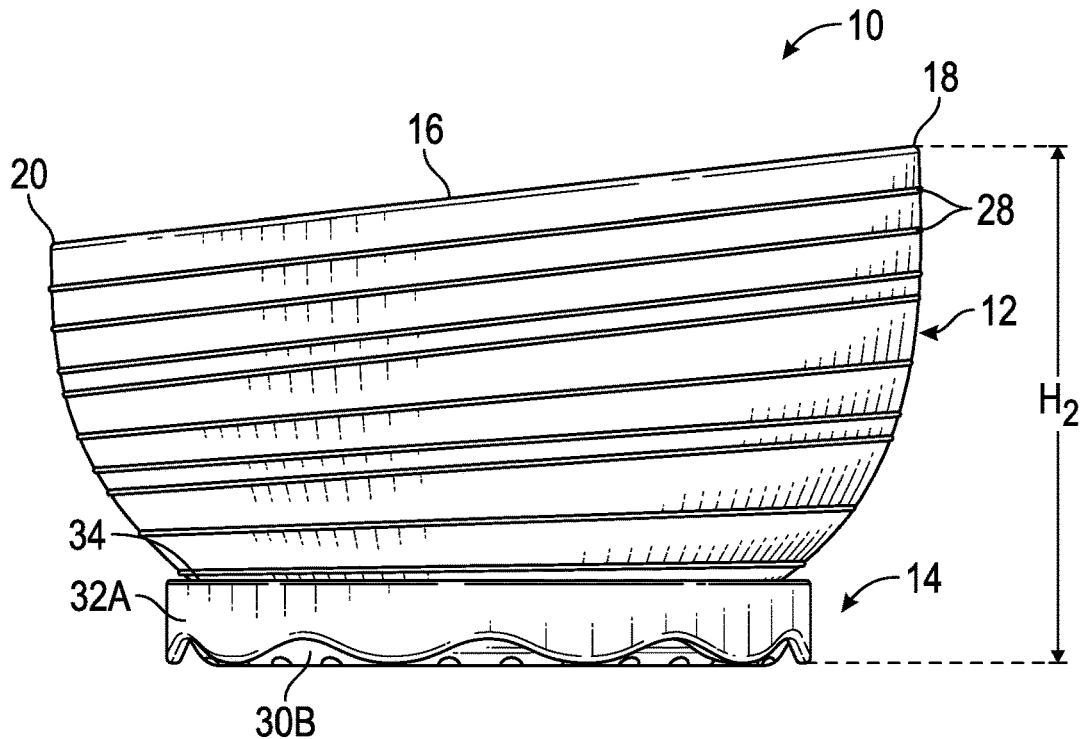
FIG. 9 is a right side view of the bowl of FIG. 1 illustrating the foot portion in the retracted position.

As mentioned above, the base portion 14 can be movable between an extended position (FIGS. 1-5) and a retracted position (FIGS. 8 and 9). In the illustrated embodiment, the base portion 14 can comprise a tiered structure including a plurality of curved (e.g., circular) first extension portions configured as hinge portions 30, and curved (e.g., circular) second extension portions 32. For example, referring to FIGS. 1-5, the hinge portions 30 and the extension portions 32 can be arranged alternatingly one above the other. In the illustrated embodiment, the base portion includes an extension portion 32A configured as a foot portion. A first hinge portion 30A can extend from the foot portion 32A at an angle to the foot portion (e.g., angled radially inward toward the bowl). The first hinge portion 30A and the foot portion 32A can be coupled to each other at a first hinge line 34 of the hinge portion 30A. An extension portion 32B can be coupled to the first hinge portion 30A at a second hinge line 36 of the hinge portion 30A. In some embodiments, the extension portion 32B can extend vertically relative to the hinge portion 30A, as shown in FIGS. 2-5. However, in other embodiments, the extension portion 32B can also be angled inwardly, as desired.

A second hinge portion 30B can extend from the extension portion 32B at an angle such that the second hinge portion is oriented radially inwardly toward the center of the bowl. The second hinge portion 30B can be coupled to the extension portion 32B at a first hinge line 38 of the hinge portion 30B. The second hinge portion 30B can be coupled to a coupling portion 40 of the bowl portion 12 at a second hinge line 42. In the illustrated embodiment, the hinge portions 30A, 30B can be pivotable about their respective hinge lines. For example, the first hinge portion 30A can be pivotable about the hinge line 34 and the hinge line 36, and the second hinge portion 30B can be pivotable about the hinge line 38 and the hinge line 42.

In certain embodiments, the hinge lines 34, 36, 38, 42 can be configured as living hinges, wherein the material of the respective hinge lines is relatively thin and flexible such that pivoting motion of the various portions of the base portion 14 occurs about the hinge lines. However, the hinge lines 34, 36, 38, 42 may also comprise other types of hinges, as desired.

With reference to FIG. 4, the foot portion 32A can have a diameter $D_1$, the extension portion 32B can have a diameter $D_2$, and the coupling portion 42 can have a diameter $D_3$. In the illustrated embodiment, the diameter $D_1$ of the foot portion 32A can be larger than the diameter $D_2$ of the extension 32B, which can be larger than the diameter $D_3$ of the coupling portion 42.

FIGS. 5-8 illustrate motion of the base portion 14 and the foot portion 32A between the extended position and the retracted position. In some embodiments, the second hinge portion 30B can be configured to pivot first when force is applied to the base portion 14. For example, when a force F is applied to the foot portion 32A, the second hinge portion 30B can pivot upwardly in the direction of arrow 44 about the hinge lines 38, 42, as shown in FIG. 5. When the hinge portion 30B has completed its pivot, the base portion can be in the position shown in FIG. 6 with the hinge portion 30B (out of view in FIG. 6) disposed concentrically and radially inwardly of the extension portion 32B.

Figure 7:
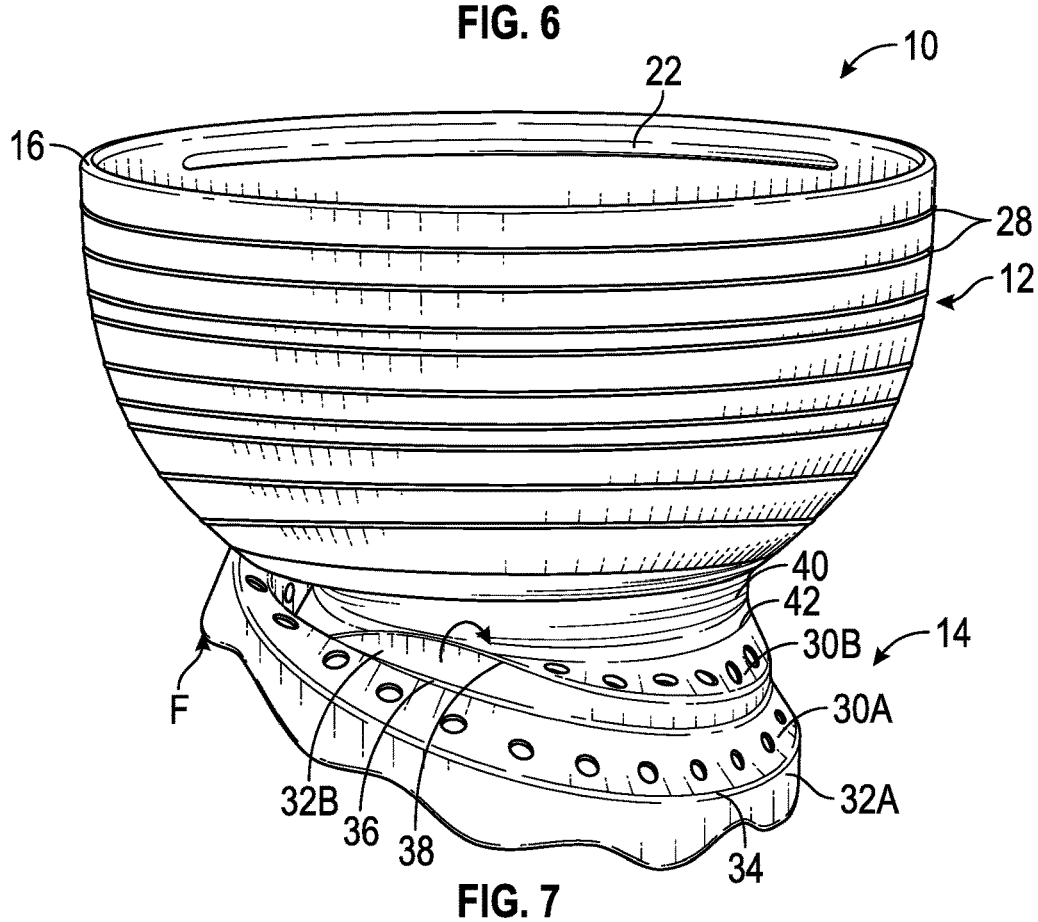
FIG. 7 is a perspective view of the bowl of FIG. 1 illustrating a portion of the base portion collapsed such that a portion of the foot portion is in the retracted position and a portion of the foot portion is in the extended position.

With reference to FIG. 7, further application of force can cause the extension portion 32B to pivot downwardly about the hinge line 38 of the hinge portion 30B, and about the hinge line 36 of the hinge portion 30A, such that the extension portion 32B is inverted relative to the foot portion 32A. In FIG. 7, the portion of the base portion 14 on the left side of the figure is collapsed such that the corresponding portion of the foot portion 32A is in the retracted position, while the portion of the base portion (and, hence, of the foot portion 32A) on the right side of the figure remains in the extended position. When the extension portion 32B is fully inverted, the base portion 14 is fully collapsed and the foot portion 32A is in the retracted position, as shown in FIG. 8. When the foot portion 32A is in the retracted position, the extension portion 32B (out of view in FIG. 8) can be nested concentrically between the coupling portion 42 and the foot portion 32A. The foot portion 32A and the hinge line 34 are also brought adjacent the bowl portion 12, as shown in FIGS. 8 and 9.

Motion of the foot portion 32A between the extended and retracted positions can raise and lower the bowl portion 12 relative to a surface on which the bowl 10 is situated. For example, referring again to FIG. 5, when the base portion 14 is in the extended position, the bowl 10 can have a first height dimension $H_1$ measured from the lower edge of the foot portion 32A to the apex of the upper rim portion 18. In a representative embodiment, the height $H_1$ can be about 8.7 cm. Referring to FIG. 9, when the foot portion 32A is in the retracted position, the height of the apex of the upper rim portion 18 can decrease to a second height $H_2$. In the illustrated embodiment, the bowl 10 can be supported on the hinge portion 30B when the foot portion 32A is in the retracted position. Thus, the second height dimension $H_2$ can be measured from the lowermost portion of the hinge portion 30B to the apex of the upper rim portion 18. In a representative embodiment, the height $H_2$ can be about 6.5 cm. Thus, in certain embodiments, motion of the foot portion 32A between the extended and retracted positions can raise and lower the height of the bowl portion 12 by about 1.2 cm. In other embodiments, the bowl 10 may also be configured to rest on the foot portion 32A when the foot portion is in the retracted position.

Referring again to FIG. 3, in use, the bowl 10 can be placed in a liquid bath 50 (e.g., a heated water bath) with the foot portion 32A in the extended position. In the illustrated embodiment, the foot portion 32A can have a scalloped edge defining a plurality of alternating extension portions 44 and recesses 46. The hinge portions 30A, 30B can also define a plurality of openings 48 extending around their circumferences. In this manner, water can flow into the interior volume defined by the base portion 14 (and air can flow out) through the recessed portions 46 and/or through the openings 48. In the illustrated embodiment, the water bath 50 can have a depth less than a height of the base portion 14 when the foot portion 32A is in the extended position. In this manner, the foot portion 32A can rest on a lower surface 52 of the water bath (e.g., on the bottom of a pot) and the bowl portion 12 can be supported above the water bath in order to heat the contents of the bowl. When it is desired to remove the bowl 10 from the water bath 50, a user can grip the handle portion 22 and remove the bowl from the water bath. The base portion 14 can then be collapsed to move the foot portion 32A to the retracted position for serving.

In some embodiments, the bowl 10 can be made from any of various flexible polymeric materials, such as silicone, plastic, etc., metals such as stainless steel, or porcelain, glass, or combinations thereof. In some embodiments, the bowl portion 12 and the base portion 14 can be made from different materials. For example, in a representative embodiment, the bowl portion can be made from plastic, and the base portion can be made from silicone. In certain embodiments, the bowl portion 12 can include a member such as a metal plate (e.g., embedded in the lower portion of the bowl) to promote heating of the contents of the bowl and/or heat retention upon removal of the bowl from the water bath 50.

In other embodiments, the foot portion 32A need not have extensions or recesses. For example, the lower edge of the foot portion 32A can be straight, or can have any other desired shape. Additionally, the hinge portions 30A, 30B may have more or fewer openings 48 than in the illustrated embodiment, or need not define openings at all, as desired. The base portion 14 can also comprise any desired number of hinge portions and extension portions depending upon, for example, the size of the tableware article, the desired height difference between the extended and retracted positions, etc. The bowl portion 12 can also be circular or oval-shaped, or can have any other desired shape, such as a non-circular shape.

Figure 13:
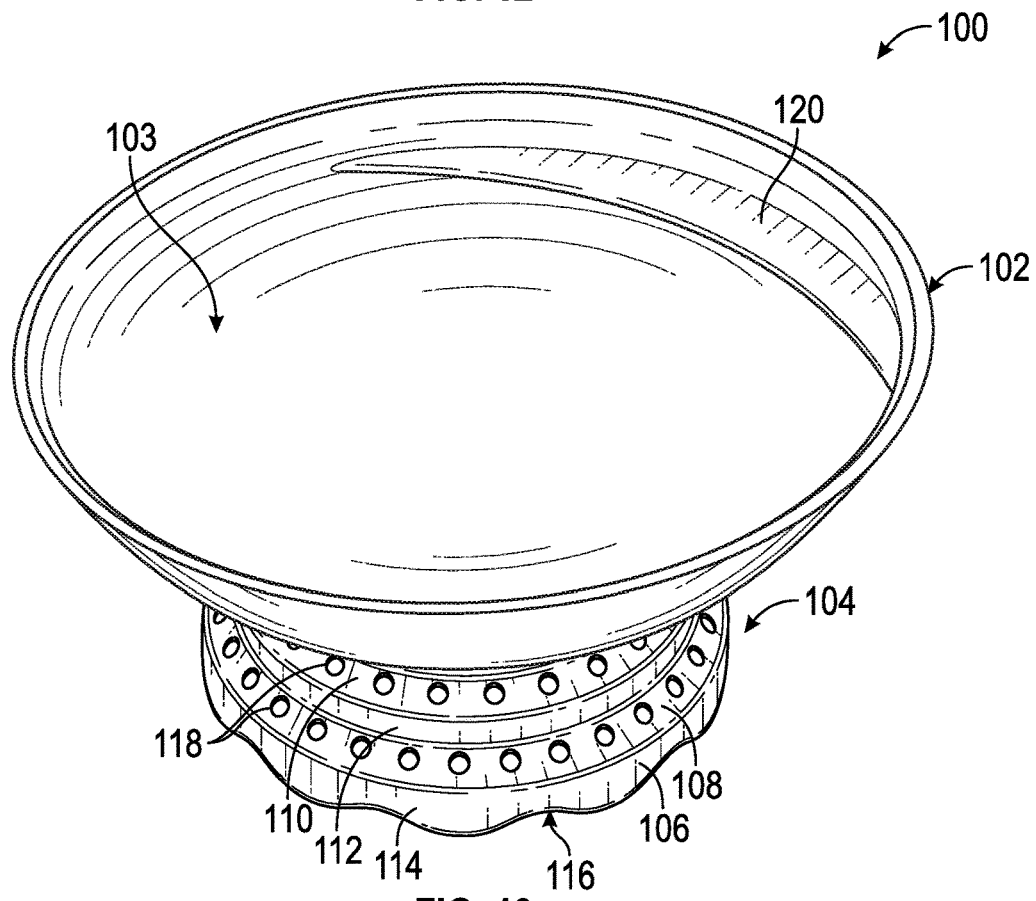
FIG. 13 is a perspective view of another embodiment of an article of tableware configured as a plate.

The collapsible base embodiments described herein can also be applicable to other types of tableware or dishware. For example, FIG. 13 illustrates another tableware article 100 having a container portion configured as a plate portion 102. The plate portion 102 can define a well 103, and can be coupled to a base portion 104. The base portion 104 can include a foot portion 106, and hinge portions 108, 110 separated by, and pivotable about, an extension portion 112, similar to the base portion 14 of FIG. 1. In this manner, the base portion 104 can be collapsible such that the foot portion 106 is movable between an extended position and a retracted position, as described above.

The foot portion 106 can also include alternating extension portions 114 and recessed portions 116, and the hinge portions 108, 110 can define a plurality of openings 118 to facilitate placement of the base portion in a water bath. The plate portion 102 can also include a handle portion 120 extending radially inward toward the center of the well 103, similar to the handle portion 22 of FIG. 1. In certain configurations, a diameter of the container portion 102 and/or a depth of the well 103 can be varied, as desired.

Figure 14:
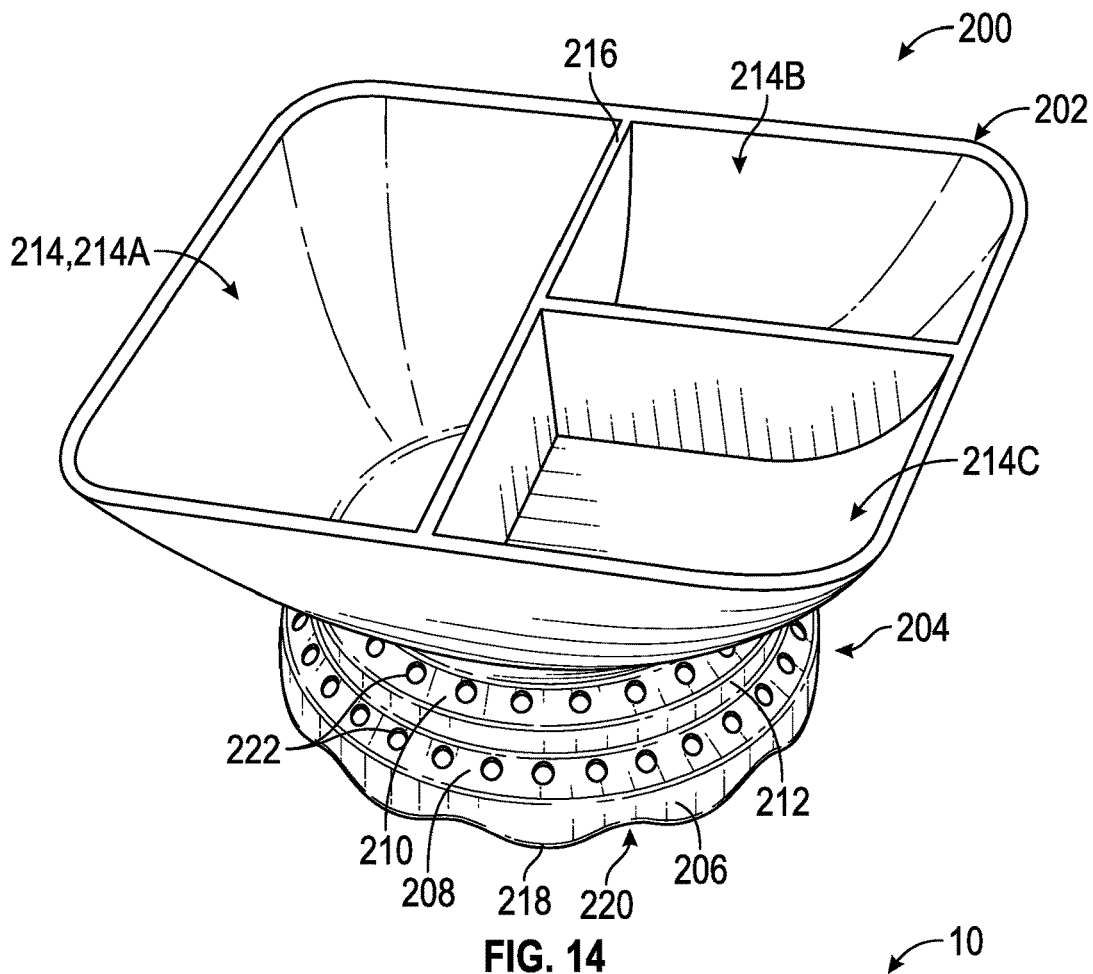
FIG. 14 is a perspective view of another embodiment of an article of tableware including a container portion having a plurality of wells.

FIG. 14 illustrates another embodiment of a tableware article 200 including a container portion 202 defining a plurality of compartments or wells 214 in the manner of, for example, a bento box. A base portion 204 is coupled to the container portion 202, and can include a foot portion 206, and hinge portions 208, 210. The hinge portions 208, 210 can be separated by, and pivotable about, an extension portion 212, similar to the base portion 14 of FIG. 1. In this manner, the base portion 204 can be collapsible such that the foot portion 206 is movable between an extended position and a retracted position, similar to the embodiments described above. The foot portion 206 can also include a plurality of extension portions 218 and recessed portions 220, and the hinge portions 208, 210 can define a plurality of openings 222.

In the illustrated embodiment, the wells 214 of the container portion 202 are separated by walls 216, and can be configured to receive, for example, different foods to be heated and/or served in the container portion. For example, in the illustrated embodiment, the container portion 202 defines three wells 214A, 214B, 214C, although the container portion may include more or fewer wells, as desired.

In other embodiments, the collapsible base portion embodiments described herein can also be applicable to other types of tableware, including dishes, platters, trays, saucers, cups, bottles, and mugs, to name a few.

Figure 15:
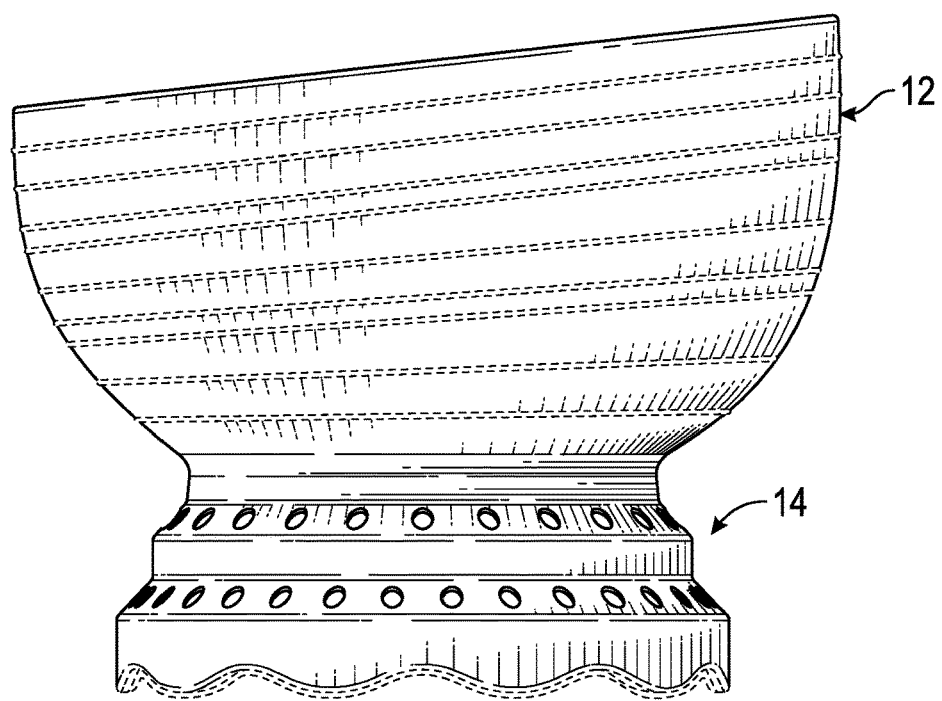
FIG. 15 is a right side view of another embodiment of the bowl of FIG. 1.
Figure 16:
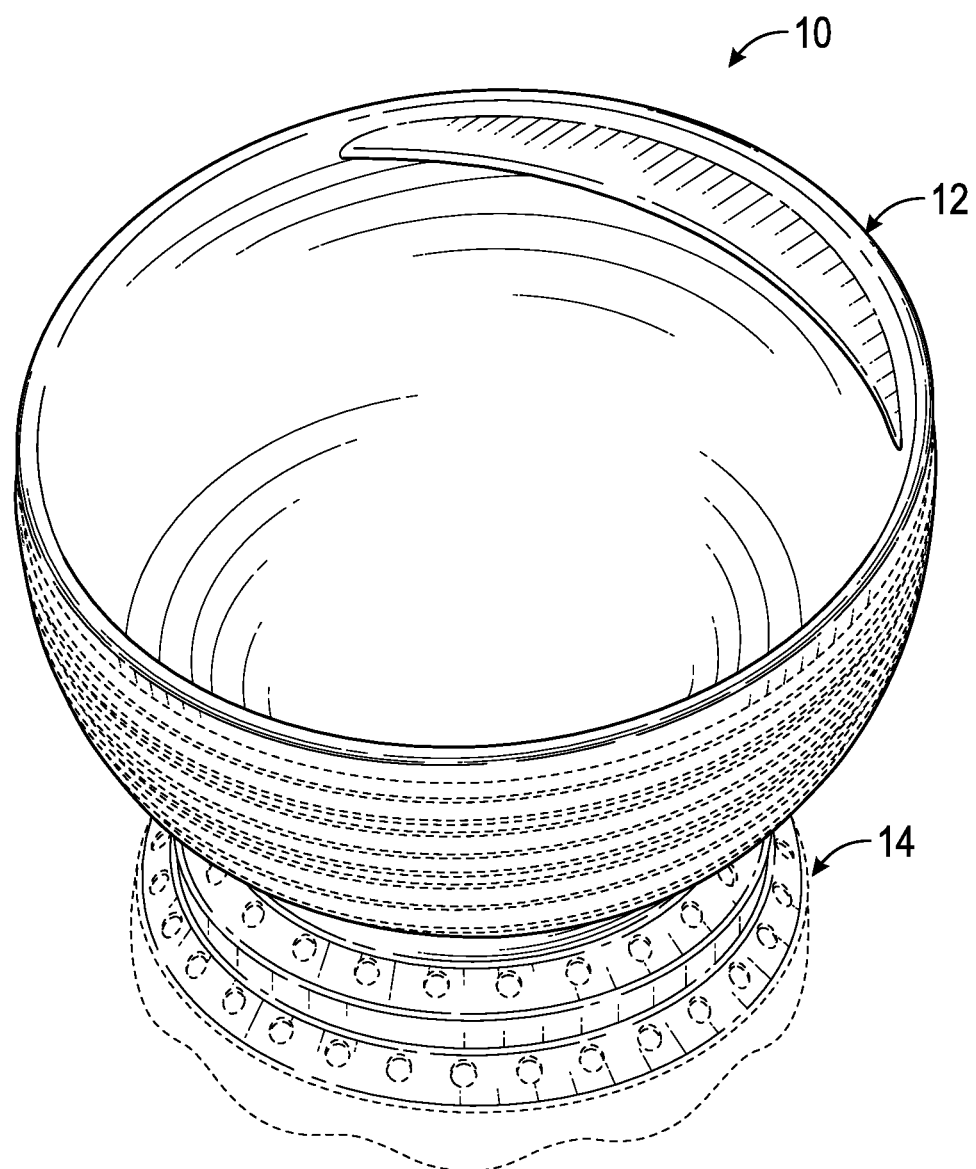
FIG. 16 is a perspective view of another embodiment of the bowl of FIG. 1.

FIGS. 15 and 16 illustrate additional embodiments of the bowl 10 of FIG. 1.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently.

Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims.

The invention claimed is:

1. An article of tableware, comprising:
a container portion comprising a wall defining a well, the container portion being configured to hold a liquid; and
a base portion coupled to the container portion, the base portion including a foot portion and a hinge portion, the hinge portion including a first hinge line and a second hinge line, the foot portion being coupled to the hinge portion at the first hinge line, the hinge portion being pivotable about the first and second hinge lines such that the foot portion is movable between an extended position and a retracted position to adjust a height of the tableware article, the base portion further comprising an extension portion coupled to the hinge portion at the second hinge line such that the hinge portion is disposed between the foot portion and the extension portion, the extension portion extending vertically relative to the hinge portion when the foot portion is in the extended position;
wherein the tableware article comprises a flexible material, and the wall of the container portion comprises an increased thickness portion extending along a portion of a perimeter of the wall and configured to limit deformation of the container portion; and
wherein a diameter of the extension portion is less than a diameter of the foot portion such that when the foot portion is in the retracted position, the extension portion is disposed concentrically within the foot portion.

2. The tableware article of claim 1, wherein:
the hinge portion is a first hinge portion; and
the base portion further comprises a second hinge portion disposed between the container portion and the extension portion.

3. The tableware article of claim 2, wherein the second hinge portion is coupled to the extension portion at a third hinge line, is coupled to the container portion at a fourth hinge line, and is pivotable about the third and fourth hinge lines.

4. The tableware article of claim 1, wherein the first and second hinge lines are configured as living hinges.

5. The tableware article of claim 1, wherein the hinge portion defines a plurality of openings.

6. The tableware article of claim 1, wherein the container portion is configured as a bowl.

7. The tableware article of claim 6, wherein an exterior surface of the container portion comprises a plurality of circumferentially-extending ridges.

8. The tableware article of claim 1, wherein a rim portion of the container portion is sloped such that the rim portion defines an upper rim portion and a lower rim portion.

9. The tableware article of claim 8, further comprising a handle portion disposed within the container portion.

10. The tableware article of claim 9, wherein the handle portion extends radially inwardly from an interior surface of the container portion.

11. The tableware article of claim 9, wherein the handle portion is crescent-shaped.

12. The tableware article of claim 9, wherein the increased thickness portion of the wall is adjacent the handle portion, and a thickness of the increased thickness portion of the wall is greater than a thickness of the wall opposite the handle portion.

13. A tableware article, comprising:
a container portion including a wall defining a well, the wall including a rim portion, the rim portion being sloped such that the rim portion defines an upper rim portion and a lower rim portion; and
a handle portion disposed within the container portion and integrally-formed with the container portion such that the tableware article can be lifted using the handle portion, the handle portion extending inwardly from an interior surface of the wall, the handle portion extending along a perimeter of the container portion between a first end and a second end of the handle portion;
wherein the wall comprises an increased thickness portion having a thickness that is greater than a thickness of the wall opposite the handle portion, the increased thickness portion extending along the perimeter of the container portion beyond the first end of the handle portion and beyond the second end of the handle portion.

14. The tableware article of claim 13, wherein the handle portion extends from the upper rim portion.

15. The tableware article of claim 13, wherein the handle portion comprises a crescent-shaped member.

16. The tableware article of claim 13, further comprising a collapsible base coupled to the container portion.

17. The tableware article of claim 16, wherein the collapsible base comprises a tiered structure.

18. The tableware article of claim 16, wherein the collapsible base comprises openings.

19. An article of tableware, comprising:
- a container portion defining a plurality of wells, each of the plurality of wells defining a volume configured to hold a liquid separate from the other wells; and
- a base portion coupled to the container portion, the base portion including a foot portion and a hinge portion, the hinge portion including a first hinge line and a second hinge line, the foot portion being coupled to the hinge portion at the first hinge line, the hinge portion being pivotable about the first and second hinge lines such that the foot portion is movable between an extended position and a retracted position to adjust a height of the tableware article.

20. A method of using the tableware article of claim 1, comprising:
- situating the tableware article in a liquid bath with the foot portion in the extended position;
- removing the tableware article from the liquid bath; and
- moving the foot portion to the retracted position.

* * * * *